United States Patent
Ueno

(10) Patent No.: US 7,032,091 B2
(45) Date of Patent: Apr. 18, 2006

(54) STORAGE DEVICE AND STORAGE DEVICE CONTROL METHOD

(75) Inventor: Koichi Ueno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 10/658,395

(22) Filed: Sep. 10, 2003

(65) Prior Publication Data

US 2004/0268035 A1 Dec. 30, 2004

(30) Foreign Application Priority Data

Jun. 27, 2003 (JP) ............................. 2003-185305

(51) Int. Cl.
*G06F 12/00* (2006.01)

(52) U.S. Cl. ...................... 711/162; 711/161; 707/204

(58) Field of Classification Search ........ 711/161–162; 714/6; 707/202–204
See application file for complete search history.

(56) References Cited

U.S. PATENT DOCUMENTS

| | | | | |
|---|---|---|---|---|
| 5,644,698 A | * | 7/1997 | Cannon | 714/6 |
| 6,212,531 B1 | | 4/2001 | Blea et al. | 707/204 |
| 6,434,681 B1 | | 8/2002 | Armangau | 711/162 |
| 6,519,581 B1 | * | 2/2003 | Hofmann et al. | 706/47 |
| 6,594,744 B1 | | 7/2003 | Humlicek et al. | 711/162 |
| 6,636,953 B1 | * | 10/2003 | Yuasa et al. | 711/161 |
| 6,651,075 B1 | | 11/2003 | Kusters et al. | 707/204 |
| 6,751,715 B1 | | 6/2004 | Hubbard et al. | 711/162 |
| 6,771,843 B1 | | 8/2004 | Huber et al. | 382/305 |
| 6,862,671 B1 | * | 3/2005 | Bergsten | 711/162 |
| 2004/0168034 A1 | | 8/2004 | Homma et al. | 711/162 |
| 2004/0186900 A1 | | 9/2004 | Nakano et al. | 709/213 |

FOREIGN PATENT DOCUMENTS

JP 10222312 A * 8/1998

OTHER PUBLICATIONS

EP 1148 416 A2 Oct. 24, 2001.

* cited by examiner

*Primary Examiner*—Nasser Moazzami
(74) *Attorney, Agent, or Firm*—Mattingly, Stanger, Malur & Brundidge, P.C.

(57) ABSTRACT

A storage device includes plural storage volumes for storing data, a unit for receiving a request for update of the data at a prescribed point in time to be stored in a first of the storage volumes after the prescribed point in time and a unit for storing a duplicate of the data at the prescribed point in time requested to be updated onto a second of the storage volumes, and a unit for storing in an unused storage area of a third of the storage volumes a duplicate of the data at the prescribed point in time requested to be updated according to a state of the second storage volume.

21 Claims, 12 Drawing Sheets

| LUN | STORAGE CAPACITY | EMPTY CAPACITY | SNAPSHOT VOLUME CONTROL ||||  USAGE |
|---|---|---|---|---|---|---|---|
| | | | VOLUME TYPE | PAIR VOLUME NO | DIFFERENCE VOLUME NO | DIFFERENCE VOLUME USABILITY | |
| 0 | 100GB | 40GB | — | — | — | ○ | DB1 |
| 1 | 500GB | 300GB | P | 2 | 6 | — | WEB |
| 2 | — | — | S | 1 | — | — | — |
| 3 | 800GB | 200GB | P | 4 | 5.9 | — | DB2 |
| 4 | — | — | S | 3 | — | — | — |
| 5 | 200GB | 0GB | DIFFERENCE | — | — | ○ | — |
| 6 | 200GB | 100GB | DIFFERENCE | — | — | ○ | DB3 |
| 7 | 100GB | 10GB | — | — | — | ○ | DB4 |
| 8 | 100GB | 90GB | — | — | — | ○ | DB5 |
| 9 | 300GB | 80GB | DIFFERENCE | — | — | ○ | DB6 |
| 10 | 300GB | 200GB | — | — | — | — | FS |

| P-VOL NO. | DIFFERENCE VOLUME CANDIDATE |
|---|---|
| 1 | LU6,LU7,LU8 |
| 3 | LU5,LU9,LU0,LU7,LU8 |
| | |

FIG.15
FORMAT CONTROL TABLE
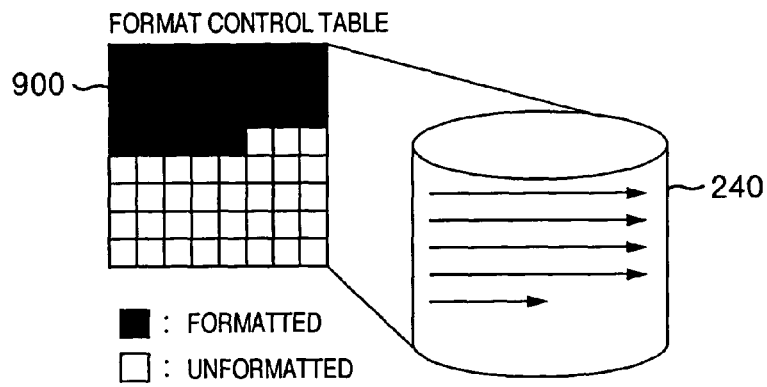
■ : FORMATTED
☐ : UNFORMATTED
FIG.16
|     | xf1 | xf2 | xf3 | ----- | | | |
|-----|-----|-----|-----|-----|---|---|---|
| yf1 | 1 | 1 | 1 | 1 | 1 | 1 | 1 |
| yf2 | 1 | 1 | 0 | 0 | 0 | 0 | 0 |
| yf3 | 0 | 0 | 0 | 0 | 0 | 0 | 0 |
|     | 0 | 0 | 0 | 0 | 0 | 0 | 0 |
|     | 0 | 0 | 0 | 0 | 0 | 0 | 0 |
|     | 0 | 0 | 0 | 0 | 0 | 0 | 0 |
← 900
FIG.17
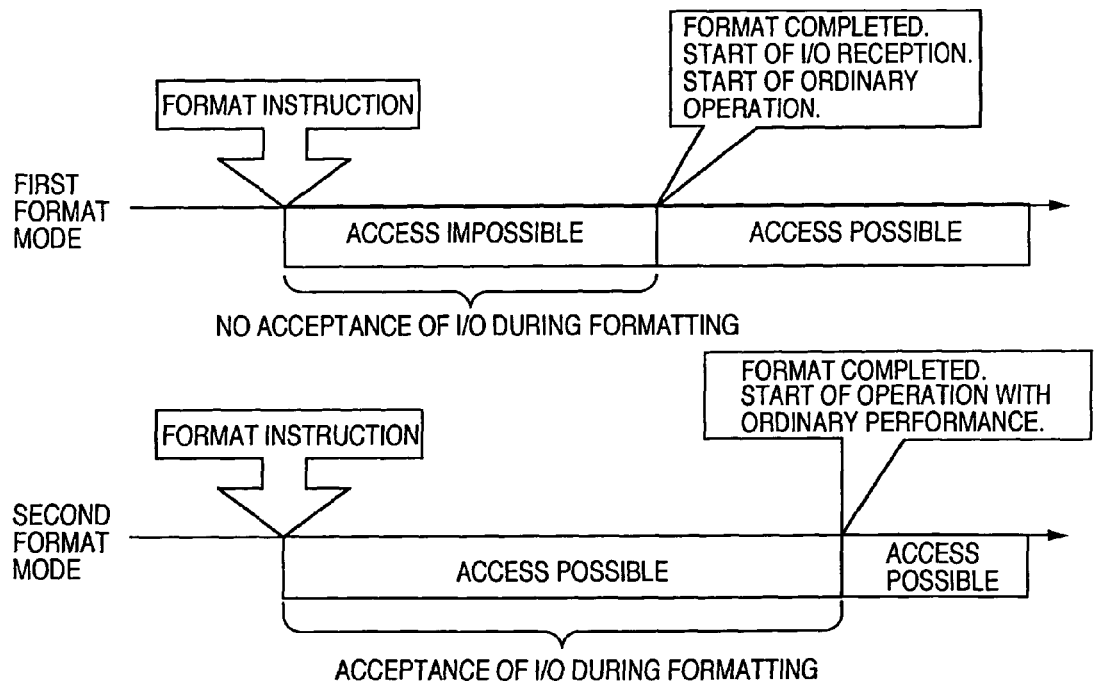

STORAGE DEVICE AND STORAGE DEVICE CONTROL METHOD

CROSS-REFERENCE TO RELATED APPLICATION

This application is based upon and claims the benefit of priority from the prior Japanese Patent Application No. 2003-185305 filed Jun. 27, 2003 in Japan, which is hereby incorporated by reference.

FIELD OF THE INVENTION

The present invention relates to a storage device and a storage device control method.

BACKGROUND OF THE INVENTION

A computer system may produce a duplicate of a storage volume having stored original data when a backup copy of data to be stored in a storage device is created. In such a case, the storage volume having stored the original data and the storage volume having stored the duplicate data must have the same contents and keep consistency. For that, it is necessary to suspend the update of the storage volume having stored the original data until the duplicate is completely produced. But, the computer system or the like required to have high availability might not able to stop access to the storage volume having stored the original data.

Therefore, there has been developed a technology called a snapshot by which, even when consistency between the storage volume having stored the original data and the storage volume having stored the duplicate data at a prescribed point in time is held and then the original data is updated after a prescribed point in time, the original data at a prescribed point in time can be referred.

According to the snapshot technology, when the original data is updated after the prescribed point in time when the consistency must be kept, the data at the prescribed point in time when the consistency must be maintained is stored in another storage volume. Specifically, the original data remains as it is when it is not updated, and when it is to be updated, the data at the prescribed point in time when the consistency must be maintained is stored in the latter storage volume.

However, it is general that the storage capacity which is provided as the second storage volume as described above is smaller than that of the storage volume storing the original data in order to cut costs, or the like.

Therefore, according to the conventional snapshot control, the period in which the consistency between the storage volume storing the original data and the latter storage volume storing the duplicate data depends on an updating frequency of the original data and the storage capacity of the latter storage volume.

SUMMARY OF THE INVENTION

The present invention has been achieved in view of the above-described circumstances and provides a storage device and a storage device control method.

In order to remedy the above-described disadvantages, the storage device according to the invention has plural storage volumes for storing data, means for receiving a request for update of the data at a prescribed point in time to be stored in a first of the storage volumes after the prescribed point in time and means for storing a duplicate of the data at the prescribed point in time requested to be updated onto a second of the storage volumes, which comprises means for storing in an unused storage area of a third of the storage volumes a duplicate of the data at the prescribed point in time requested to be updated according to a state of the second storage volume.

Thus, for example, even when the storage capacity of the unused storage area of the second storage volume (another storage volume) becomes smaller than a judgment value, the consistency between the storage volume storing the original data and the storage volume storing the duplicate data can be maintained by storing the duplicate of the data onto the third storage volume. And, the consistency between the storage volume storing the original data and the storage volume storing the duplicate data can be maintained without depending on an update frequency of data to be stored onto the first storage volume.

Here, the storage volume is a storage resource including a physical volume which is a physical storage area provided by a disk drive configured of a hard disk device, a semiconductor memory device or the like and a logical volume which is a storage area logically set on the physical volume. It is also possible to use a spare disk as the storage volume.

Problems disclosed by the application and methods of solving such problems will be clarified with reference to the fields of the embodiments of the invention and the drawings.

Thus, the present invention can provide a storage device and a storage device control method that can copy data without depending on a data updating frequency or storage capacities of storage volumes storing data at a point of time when the consistency must be maintained.

Other objects, features and advantages of the invention will become apparent from the following description of the embodiments of the invention taken in conjunction with the accompanying drawings.

BRIEF DESCRIPTION OF THE DRAWINGS

Preferred embodiments of the present invention will now be described in conjunction with the accompanying drawings, in which:

FIG. 9 is a diagram showing a volume control table according to the embodiment;

FIG. 10 is a diagram showing a difference volume control table according to the embodiment;

FIG. 15 is a block diagram illustrating a format according to the embodiment;

FIG. 16 is a diagram showing a format control table according to the embodiment;

FIG. 17 is a block diagram illustrating a format according to the embodiment;

DESCRIPTION OF THE EMBODIMENTS

Embodiments of the invention will be described in detail with reference to the accompanying drawings.

Figure 1:
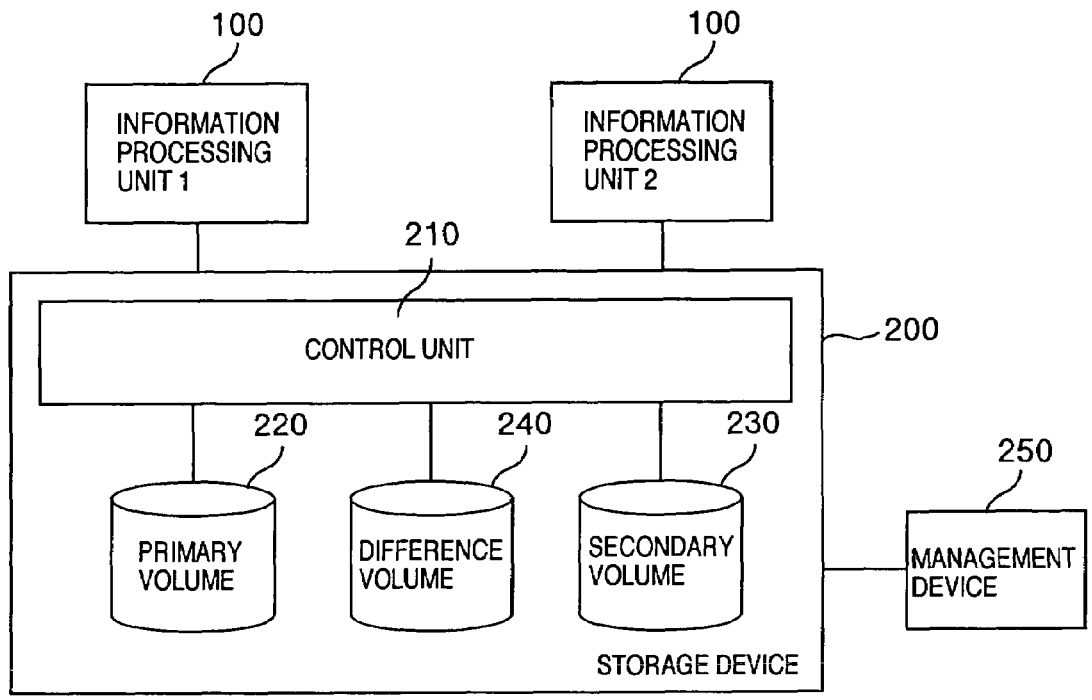
FIG. 1 is a block diagram showing a general configuration of an information processing system including a storage device according to an embodiment of the invention.

General Configuration Example:

A block diagram showing a general configuration of an information processing system including a storage device 200 according to an embodiment is shown in FIG. 1. The information processing system according to the embodiment is provided with an information processing unit 1 (100), an information processing unit 2 (100), a storage device 200 and a management device 250.

Information Processing Unit:

The information processing unit 1 (100) and the information processing unit 2 (100) are computers having a CPU (Central Processing Unit) and a memory. Various functions are performed by various types of programs executed by the CPU of the information processing unit 100. The information processing unit 100 is used as a central computer of, for example, automatic teller machines of banks and airline seat reservation systems. The information processing unit 100 can be a mainframe computer or a personal computer.

The information processing unit 100 is communicably connected to the storage device 200 to send a data I/O request to the storage device 200. The data I/O request is, for example, a data readout request, a write request (update request) or the like. Thus, the information processing unit 100 reads data stored in the storage device 200 and writes into it.

The information processing unit 100 can also be configured to send various commands for managing the storage device 200 to the storage device 200. The commands for managing the storage device 200 include, for example, a snapshot command to be described later. The information processing unit 100 is not limited to be used in two but can also be used in one or three or more.

Storage Device:

The storage device 200 includes a control unit 210, a primary volume (first storage volume) 220, a secondary volume 230 and a difference volume (second storage volume) 240. The storage device 200 is communicably connected to the management device 250.

Storage Volume:

The primary volume 220 and the difference volume 240 are storage volumes for storing data. The storage volume is a storage resource including a physical volume, which is a physical storage area provided by a disk drive configured of a hard disk device, a semiconductor memory device or the like possessed by the storage device 200, and a logical volume, which is a storage area logically determined on the physical volume.

Figure 3:
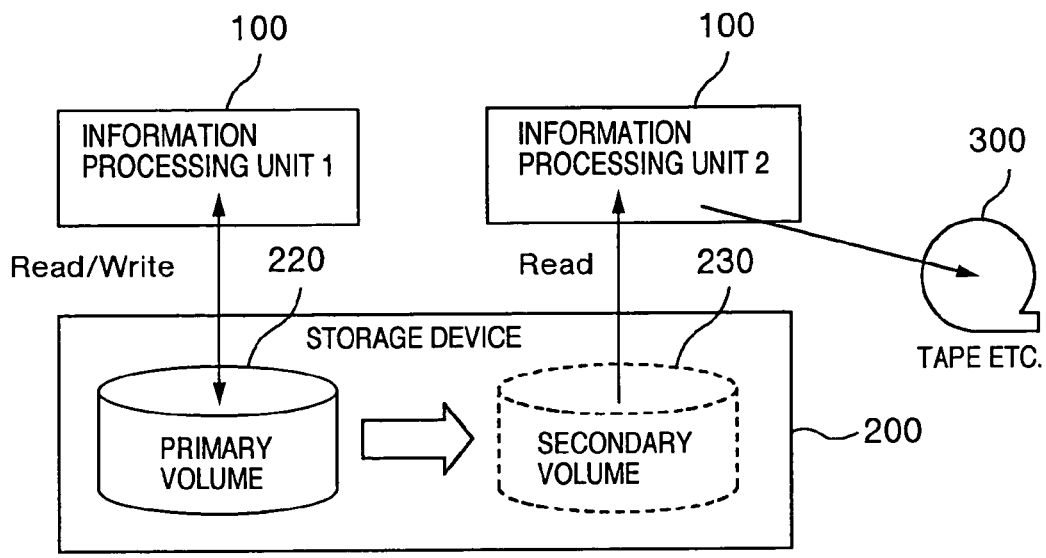
FIG. 3 is a diagram showing a primary volume and a secondary volume for a snapshot according to the embodiment.

Meanwhile, the secondary volume 230 is a storage volume, which is virtually possessed by the storage device 200. The information processing unit 100 sends, for example, a data readout request to the secondary volume 230 as if there is the secondary volume 230. For example, the information processing unit 2 (100) can record the data read from the secondary volume 230 on a tape 300 or the like as shown in FIG. 3.

Snapshot Control:

The storage device 200 can control the data, which is read from the secondary volume 230, according to a snapshot command sent from the information processing unit 100. Specifically, the storage device 200 can control according to a snapshot command to read data having the same content as that stored in the primary volume 220 from the secondary volume 230 or to read data, which is stored in the primary volume 220 at a prescribed point in time, from the secondary volume 230. This control is called as the snapshot control. The prescribed point in time can be, for example, a point in time when the storage device 200 has received a snapshot command or a time when it is given instructions by the snapshot command.

In the former case, namely when the data to be read from the secondary volume 230 has the same content as that of the data stored in the primary volume 220 and when the information processing unit 1 (100) updates the data stored in the primary volume 220, the storage device 200 controls in such a way that the updated data is also reflected in the secondary volume 230. At this time, when a readout request for the data stored in the secondary volume 230 is received from the information processing unit 2 (100), the storage device 200 sends the data stored in the primary volume 220 to the information processing unit 2 (100). Thus, the information processing unit 100 can obtain the same data as that of the primary volume 220 by reading the data from the secondary volume 230.

In the latter case, however, when the data to be read from the secondary volume 230 is assumed to be data stored in the primary volume 220 at a prescribed point in time and, for example, when the information processing unit 1 (100) updates the data stored in the primary volume 220, the storage device 200 controls to store data, which is at a point in time stored in the primary volume 220 and before the update, onto the difference volume 240. At this time, when a readout request for the data stored in the secondary volume 230 is received from the information processing unit 2 (100), the storage device 200 sends the data stored in the difference volume 240 to the information processing unit 2 (100). Thus, the information processing unit 100 reads data from the secondary volume 230 and can obtain data at a prescribed point in time in the primary volume 220 regardless of whether the primary volume 220 is updated or not. In this case, even when the same data stored in the primary volume 220 is updated two or more times, data to be stored in the difference volume 240 is only one at a prescribed point in time. Thus, the latest data is stored in the primary volume 220, and data at a prescribed point in time is maintained by the difference volume 240. It can also be configured that when the storage device 200 receives an update request for data to be stored in the primary volume 220 from the information processing unit 1 (100), the updated data is stored in the difference volume 240. In this case, data before the update at a prescribed point in time is stored in the primary volume 220.

Figure 4:
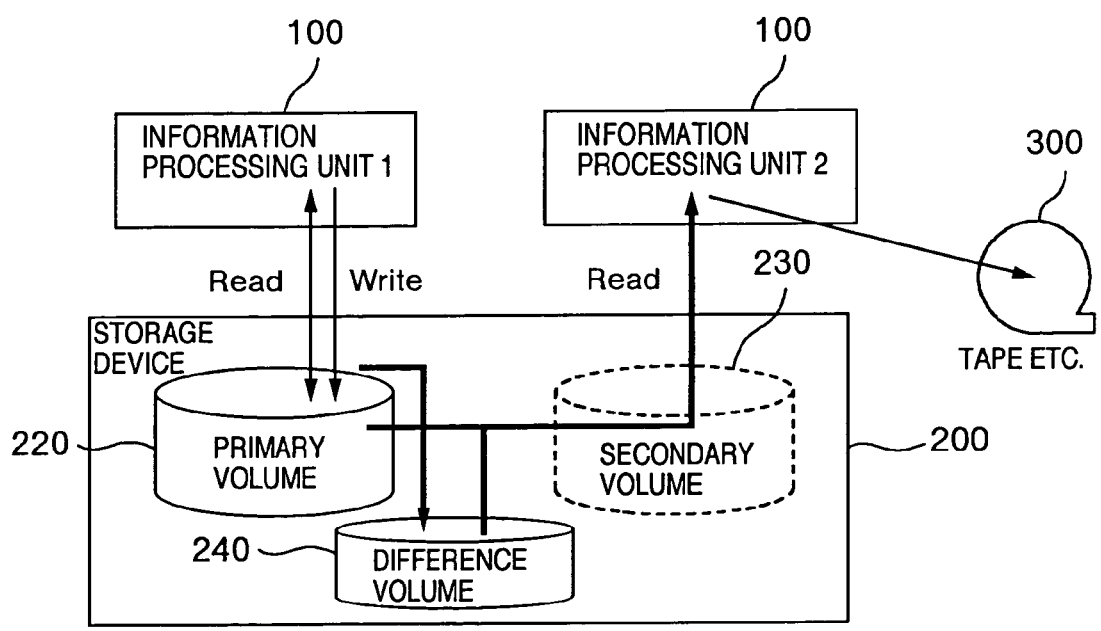
FIG. 4 is a diagram showing an outline of snapshot processing according to the embodiment.

The above procedure is shown in FIG. 4.

Figure 7:
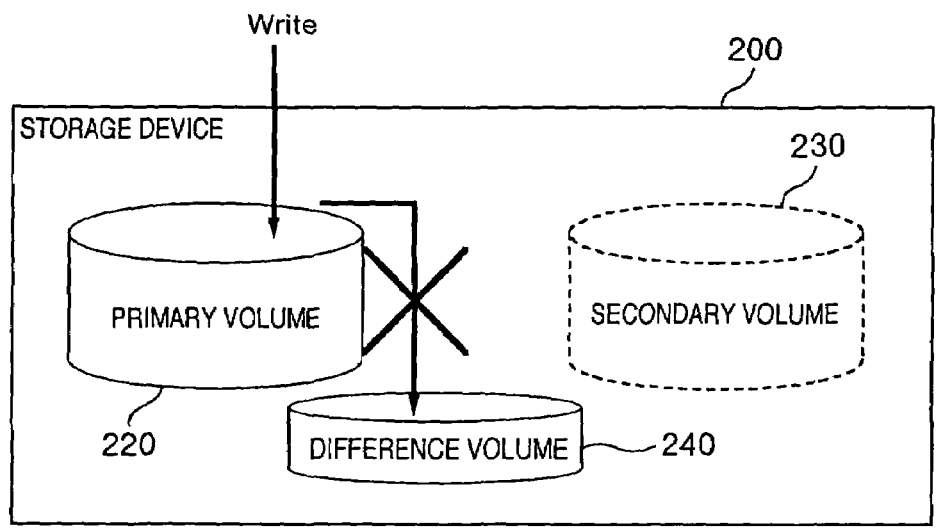
FIG. 7 is a diagram showing an outline of the snapshot processing according to the embodiment.

In the above-described latter case, the data at a prescribed point in time of the primary volume 220 to be stored in the difference volume 240 increases with the update of data to be stored in the primary volume 220. Therefore, when an unused storage area of the difference volume 240 has lost a storage capacity as shown in FIG. 7, the storage device 200 cannot store data at a prescribed point in time before updating onto the difference volume 240 even if an update request for data at a prescribed point in time stored in the primary volume 220 is received.

Figure 8:
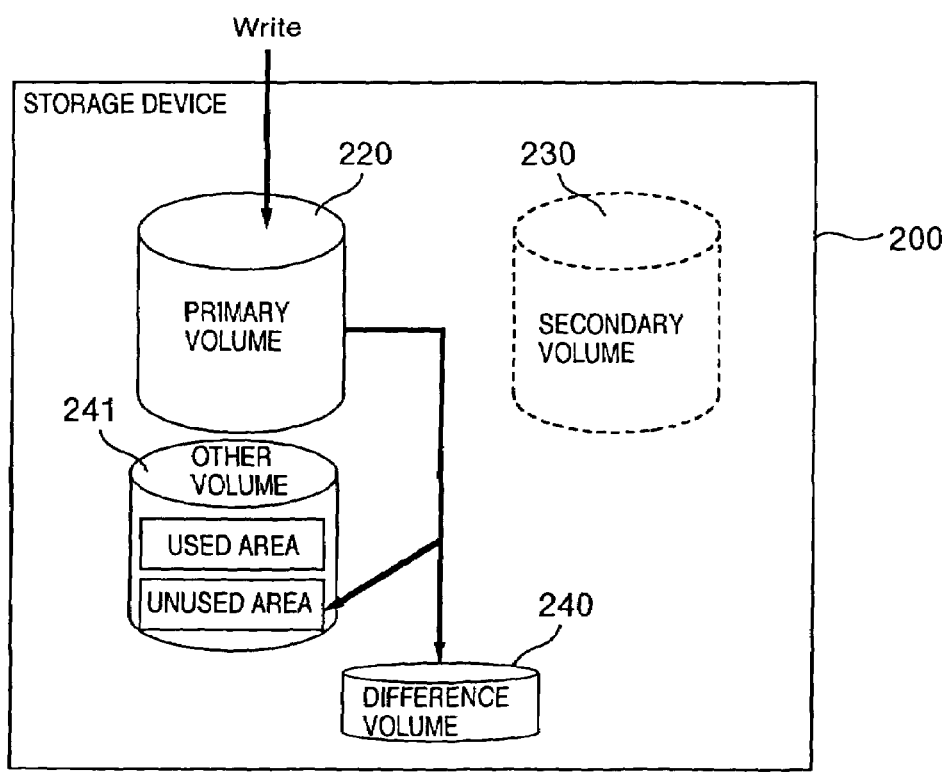
FIG. 8 is a diagram showing an outline of the snapshot processing according to the embodiment.

In such a case, another storage volume (third storage volume) 241, which is different from the difference volume 240, is used as the difference volume 240 in this embodiment as shown in FIG. 8, and data at a prescribed point in time before the update of the primary volume 220 is stored in its unused storage area.

Thus, even when the storage capacity of the unused storage area of the difference volume 240 becomes small, data in the primary volume 220 at a prescribed point in time can be maintained continuously.

For example, when the information processing unit 2 (100) reads data from the secondary volume 240 to write on the tape 300 so to execute a backup processing of data at a prescribed point in time of the primary volume 220 as shown in FIG. 3, the storage device 200 does not store a duplicate of the data at a prescribed point in time stored in the primary volume 220 onto the difference volume 240 but stores onto an unused storage area of another storage volume 241 depending on a state of the difference volume 240. Thus, the backup processing of data at a prescribed point in time in the primary volume 220 can be continued. The state of the difference volume 240 includes a state that a storage capacity of an unused storage area of the difference volume 240 becomes smaller than a judgment value, a state that a ratio of a storage capacity of the unused storage area to a total storage capacity becomes smaller than a judgment value, a state that a used storage capacity becomes larger than a judgment value, or a state that a ratio of the used storage capacity to a total storage capacity becomes larger than a judgment value.

Figure 2:
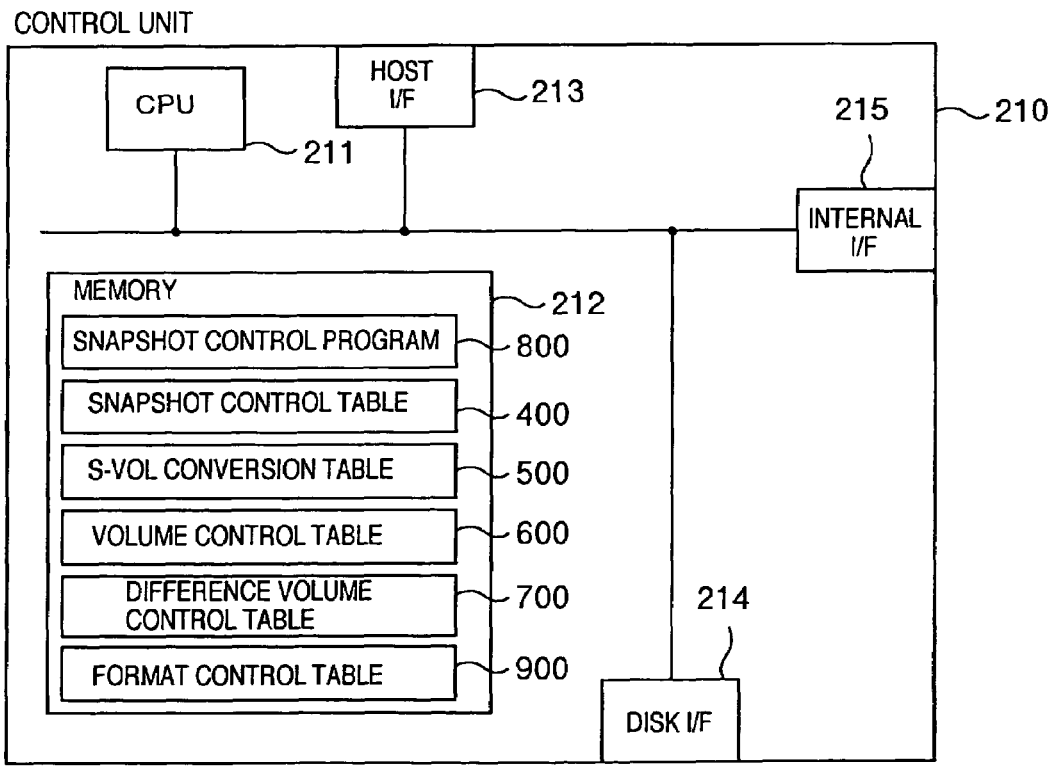
FIG. 2 is a block diagram showing a configuration of a control unit in the storage device according to the embodiment.

Control Unit:

The control unit 210 functions as means for executing various controls according to the embodiment. A block diagram showing a configuration of the control unit is shown in FIG. 2.

In this embodiment, the control unit 210 is provided with a CPU (Central Processing Unit) 211, a memory 212, a host I/F (InterFace) 213, a disk I/F 214 and an internal I/F 215.

The CPU 211 controls the control unit 210 as the whole and executes a snapshot control program 800 stored in the memory 212. The snapshot control according to the embodiment is conducted by the snapshot control program 800 stored in the memory 212 and executed by the CPU 211.

The memory 212 is used to store the snapshot control program 800, a snapshot control table 400, an S-VOL (Secondary VOLume) conversion table 500, a volume control table 600, a difference volume control table 700 and a format control table 900, which will be described later.

The host I/F 213 functions as a communication interface for communicating with the information processing unit 100. The communications conducted between the information processing unit 100 and the storage device 200 can be configured to be conducted according to a variety of communication protocols. For example, they are a fiber channel, a SCSI (Small Computer System Interface), an FICON (Fiber Connection) (Registered Trademark), an ESCON (Enterprise System Connection) (Registered Trademark), an ACONARC (Advanced Connection Architecture) (Registered Trademark), an FIBARC (Fiber Connection Architecture) (Registered Trademark), a TCP/IP (Transmission Control Protocol/Internet Protocol), etc. Such communication protocols can be used in a combination of two or more. For example, the communications with the information processing unit (IUU) can be executed th-rough a fiber channel, and the communications with the information processing unit 2 (100) can be executed by the TCP/IP. For example, when the information processing unit 100 is a mainframe computer, the FICON, the ESCON, the ACONARC or the FIBARC is used. When the information processing unit 100 is an open-type computer, for example, the fiber channel, the SCSI or the TCP/IP is used. A data I/O request from the information processing unit 100 can be made with a block, which is a data management unit in the storage volume, as a unit, or in a file unit by designating a file name. In the latter case, the storage device 200 functions as an NAS (Network Attached Storage) for realizing access at a file level from the information processing unit 100.

The disk I/F 214 functions as a communication interface for executing data I/O control of the storage volume.

The internal I/F 215 functions as a communication interface for communicating with the management device 250. And, the storage device 200 can be configured to have plural control units 210. The internal I/F 215 can also be configured to function as a communication interface for communicating with another control unit 210.

Management Device:

In FIG. 1, the management device 250 is a computer used for maintenance and management of the storage device 200. For example, the management device 250 can be operated to set a disk drive, to set a storage volume, to install the snapshot control program 800 to be executed by the control unit 210, or the like. The management device 250 is also provided with a recording medium reading device, which can be used to read the snapshot control program 800 from a recording medium.

A snapshot command can also be sent from the management device 250 to the storage device 200. The management device 250 can also be configured to be externally fitted to the storage device 200 or to be built into it. And, the functions possessed by the management device 250 can be configured to be possessed by the information processing unit 100.

Figures 5, 6:
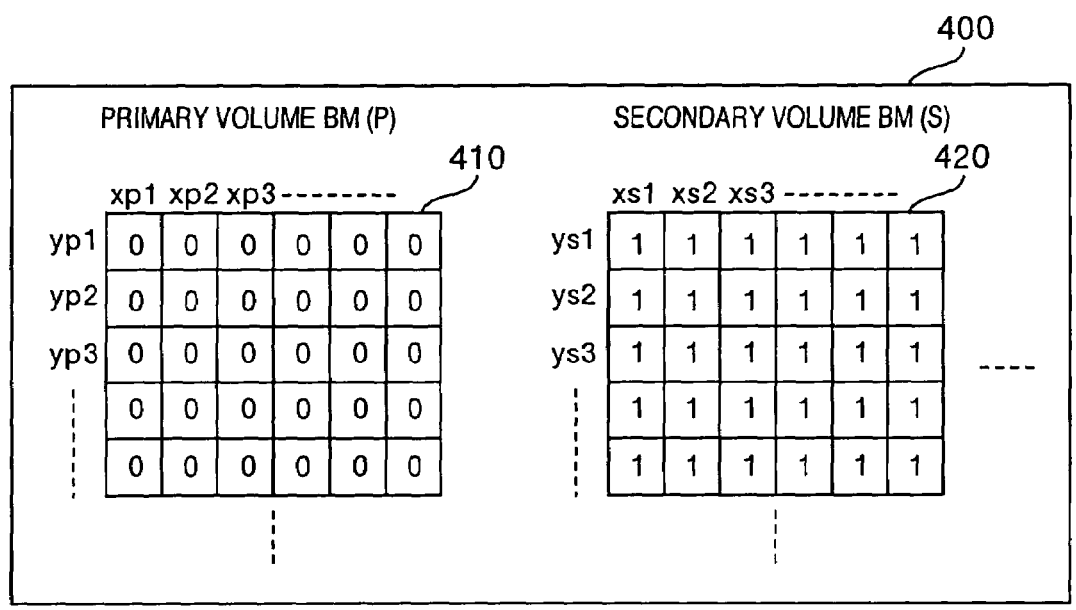
FIG. 5 is a diagram showing a snapshot control table according to the embodiment.
FIG. 6 is a diagram showing an S-VOL conversion table according to the embodiment.

Snapshot Control Table, S-VOL Conversion Table:

Then, the snapshot control table 400 will be described with reference to FIG. 5. The snapshot control table 400 is a table used for conducting the above-described snapshot control. When a data I/O request is made from the information processing unit 100 to the secondary volume 230, the CPU 211 can refer to the snapshot control table 400 to find whether access shall be made to the primary volume 220 or the difference volume 240 in response to the data I/O request. The snapshot control table 400 is not limited to the bit map shown as an example in FIG. 5 but may be a list structure, a pointer indicating a physical address, or the like. The snapshot control table 400 can be configured to have any form as management information or control information if it can be used for management or control of correspondence between the primary volume 220 and the secondary volume 230 to be described bellow.

In the snapshot control table 400, a primary volume BM (P) 410 indicates a data holding state by the primary volume 220, and a secondary volume BM (S) 420 indicates a data holding state by the secondary volume 230. Specifically, the primary volume BM (P) 410 or the secondary volume BM (S) 420 each indicates that the data is valid if a bit value is "0". And, when the bit value is "1", it indicates that the data is invalid.

Designation of each bit on the bit map is executed by designating (xpi, ypj) (i, j=1, 2, . . . ) for the primary volume BM (P) 410, and (xsi, ysj) (i, j=1, 2, . . . ) for the secondary volume BM (S) 420.

On the bit maps of the primary volume BM (P) 410 and the secondary volume BM (S) 420, the corresponding bits correspond to the individual corresponding storage areas of the primary volume 220 and the secondary volume 230. The bit values of the primary volume BM (P) 410 and the secondary volume BM (S) 420 correspond to a state of data on blocks or tracks as a data storage unit on the primary volume 220 and the secondary volume 230. For example, when each bit corresponds to one track, the bit value specified by (xpi, ypj) indicates, for example, a state of data on a track which is uniquely determined by cylinder No. xpi and head No. ypj of the primary volume 220. The secondary volume 230 is a virtual storage volume, so that actual data is stored in the primary volume 220, the difference volume 240 and the other storage volume 241. Therefore, when a data I/O request is made to the secondary volume 230, (xsi, ysj) (i, j=1, 2, . . . ) indicating a virtual storage area in the secondary volume 230 is converted into (xsi', ysj') (i', j'=1, 2, . . . ) indicating an actual storage area in the primary volume 220, the difference volume 240 or the other storage volume 241 by the S-VOL conversion table shown in FIG. 6 to execute a data I/O processing.

As described above, when the bit value is "0" in the primary volume BM (P) 410 or the secondary volume BM (S) 420, it indicates that the data is valid, but when the bit value is "1", it indicates that the data is invalid. For example, when all the bit values on the primary volume BM (P) 410 are "0" and all the bit values on the secondary volume BM (S) 420 are "1" as shown in FIG. 5 and, when a data readout request is made from the information processing unit 100 to the secondary volume 230, the storage device 200 reads data from the primary volume 220 and sends it to the information processing unit 100. Specifically, the storage device 200 can control as if a duplicate of the primary volume 220 is stored in the secondary volume 230 by determining that all the bit values on the primary volume BM (P) 410 are "0" and all the bit values on the secondary volume BM (S) 420 are "1".

Meanwhile, where it is configured that the storage device 200 receives a snapshot command from the information processing unit 100 and controls as if a duplicate of the data of the primary volume 220 at a prescribed point in time is stored in the secondary volume 230, when an update request for data of the primary volume 220 is received from the information processing unit 100 after the prescribed point in time, the storage device 200 stores data at a prescribed point in time before the update onto the difference volume 240, stores the updated data onto the primary volume 220, and updates the bit values of the primary volume BM (P) 410 and the secondary volume BM (S) 420 to "0". In such a case, when a data readout request is made to the primary volume 220, the updated data is read from the primary volume 220, and when a data readout request is made to the secondary volume 230, data at a prescribed point in time before the update is read not from the primary volume 220 but from the difference volume 240 or the other storage volume 241.

Naturally, even when it is controlled as if a duplicate of the data at a prescribed point in time of the primary volume 220 as described above is stored in the secondary volume 230, if an update request for data of the primary volume 220 is not received, the data at a prescribed point in time is kept stored in the primary volume 220, so that the bit value for the data of the primary volume BM (P) 410 is "0", and the bit value for the data of the secondary volume BM (S) 420 is "1". Therefore, when a data readout request is made from the information processing unit 100 to the secondary volume 230, the storage device 200 reads data from the primary volume 220 and sends it to the information processing unit 100.

Thus, the storage device 200 refers to the snapshot control table 400 and, when there is a data I/O request from the information processing unit 100 to the secondary volume 230, it can be known whether data must be read from the primary volume 220 or from the difference volume 240.

The snapshot control table 400 is important as control information disposed on the memory 212 within the control device 210, and when the memory 212 is a volatile memory, it can be configured to make a backup copy of the snapshot control table 400 in the volatile memory. It can also be configured to store the snapshot control table 400 in a storage volume possessed by the storage device 200. Other tables to be described later can also be stored in the same way.

Volume Management Table, Difference Volume Management Table:

Then, the volume control table 600 according to the embodiment will be described with reference to FIG. 9. The volume control table 600 is a table for controlling the storage volumes provided in the storage device 200.

The volume control table 600 has a "LUN" field, a "storage capacity" field, an "empty capacity" field, a "snapshot volume control" field, and a "usage" field. The "snapshot volume control" field has also a "volume type" field, a "pair volume No" field, a "difference volume No" field and a "difference volume usability" field.

The "LUN" field indicates numbers for identification of storage volumes. For example, it is given when a storage volume is determined by the management device 250 or the like.

The "storage capacity" field indicates a total storage capacity of the storage volumes. The storage volume having "-" indicated in the "storage capacity" field is a storage volume virtually provided in the storage device 200.

The "empty capacity" field indicates a storage capacity of an unused storage area of the storage volume. The storage volume having "-" indicated in the "storage capacity" field also has indicated in the "empty capacity" field.

The "volume type" field indicates whether the storage volume is used as the primary volume 220 for the snapshot control, as the secondary volume 230, or as the difference volume 240. When "P" is indicated, it indicates a storage volume uses as the primary volume 220. When "S" is indicated, it indicates a storage volume used as the secondary volume 230. When "difference" is indicated, it indicates a storage volume used as the difference volume 240. When "-" is indicated, it indicates a storage volume not subject to the snapshot control. As described above, the secondary volume 230 is a storage volume virtually possessed by the storage device 200, so that "-" is indicated in the "storage capacity" field and the "empty capacity" field for the storage volume having "S" shown in the "volume type" field.

The LUN of the primary volume 220 or the secondary volume 230 or the LUN of the secondary volume 230 or the primary volume 220 is entered in the "pair volume NO" field.

The LUN of the difference volume 240 to the primary volume 220 is entered in the "difference volume NO" field. In the example shown in FIG. 9, the difference volume 240 to the primary volume 220 having LUN=1 has LUN=6. And, the difference volume 240 to the primary volume 220 having LUN=3 has LUN=5 and LUN=9. Here, when attention is focused on the "empty capacity" field of LUN=5, 0 GB (Giga Byte) is indicated. In other words, it is seen that the storage area of the difference volume 240 has been used up. Therefore, an unused storage area of LUN=9 is used as the difference volume 240 so to keep storing data at a prescribed point in time of the primary volume 220 (LUN=3).

The "difference volume usability" field is a field indicating whether the storage volume may be used as the difference volume 240. When "○" is entered, it indicates that the storage volume is allowed to be used as the difference volume 240. When "-" is entered, it indicates that the storage volume is allowed to be used as the difference volume 240. For example, an empty capacity of LUN=6 is 100 GB now, and when it becomes 0 GB in future, an unused storage area of another storage volume 241 is used as the difference volume 240. At this time, another storage volume 241 is selected from the storage volumes which have "○" entered in the "difference volume usability" field.

The selection of the other storage volume 241 to be used as the difference volume 240 can also be made with reference to the difference volume control table 700 shown in FIG. 10. The difference volume control table 700 shows a storage volume which becomes a candidate for the difference volume 240 for each primary volume 220. For example, the difference volume control table 700 can be configured to be prepared according to information for designating a candidate for the difference volume 240 input by an operator or the like through a user interface disposed in the management device 250.

For selection of another storage volume 241 to be used as the difference volume 240, it can be configured to select the storage volume according to the empty capacity or select the storage volume according to the LUN from, for example, the storage volumes to be candidates regardless of whether the difference volume control table 700 is referred to or not. And, the storage volume can be selected according to the number of times of a data I/O request per unit time or the storage volume can be selected according to a ratio of the empty capacity to the total storage capacity. Besides, a storage volume can also be selected by, for example, an operator or the like who inputs information for designating the storage volume to be used as the difference volume 240 through the user interface possessed by the management device 250.

The "usage" field shows usage of each storage volume. When "DB" is shown, it indicates that the storage volume is used by a database application. When "WEB" is shown, it indicates that the storage volume is used by a WEB application. When "FS" is shown, it indicates that the storage volume is used by an operating system. When "-" is shown, it indicates that the storage volume is not used for a particular application. For example, LUN=5 is used as the difference volume 240 only. Even when "DB" is shown in the "usage" field, it can be configured that the storage volume is used with an application other than the database application. And, each storage volume can also used for usage other than the above usage.

The contents indicated in the volume control table 600 shown in FIG. 9 and the contents indicated in the difference volume control table 700 shown in FIG. 10 can be configured to be shown on the user interface possessed by the management device 250 or the information processing unit 100. For example, when an empty capacity of the difference volume 240 is indicated, the operator or the like can know a storage capacity of an unused storage area of the difference volume 240. Thus, when it is judged that the difference volume 240 has become insufficient, an additional disk drive can be installed before the storage area of the difference volume 240 is used up to increase the storage capacity of the difference volume 240. And, the setting of the storage volume possessed by the storage device 200 can also be changed to increase the storage capacity of the difference volume 240.

Figure 11:
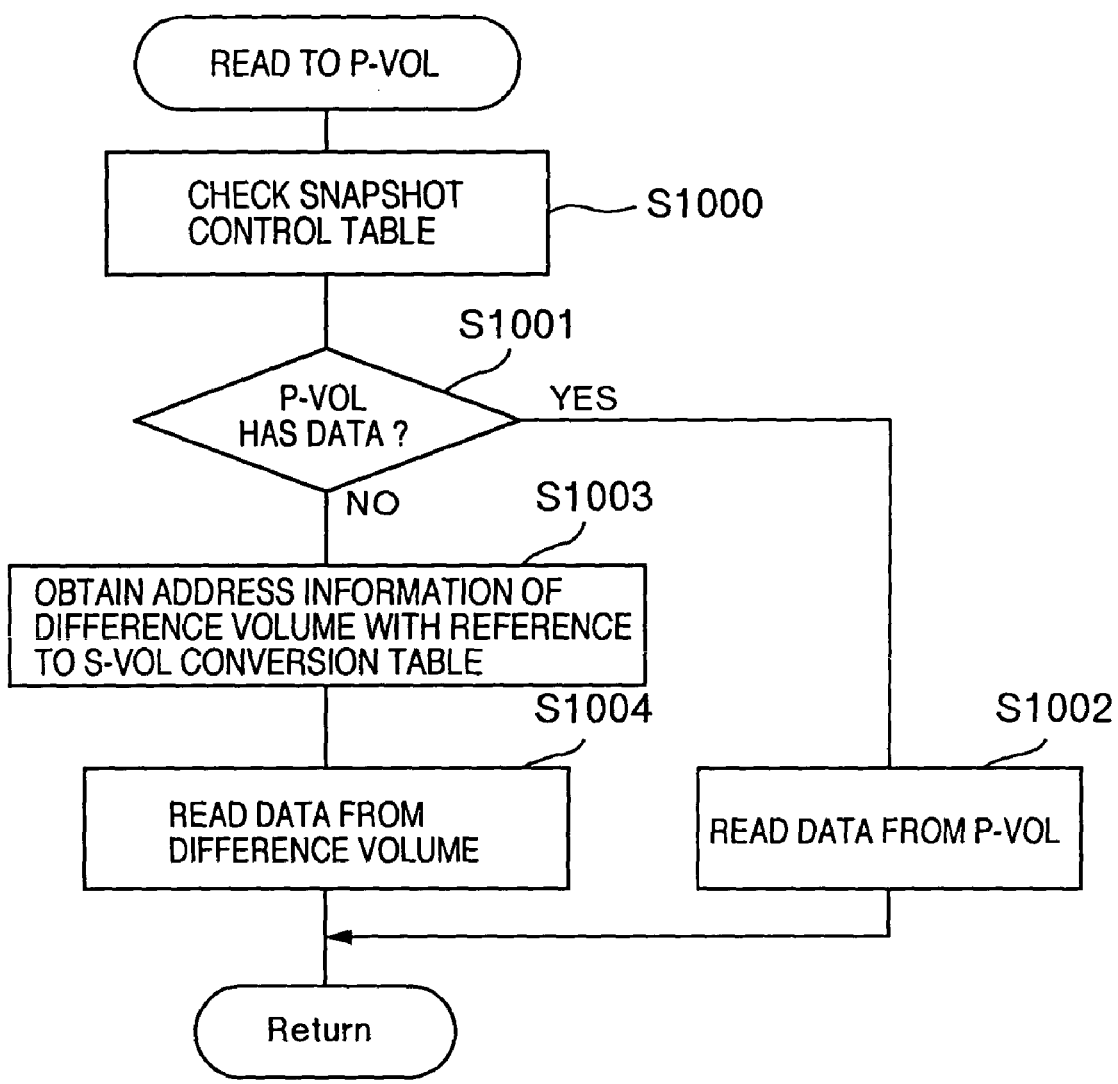
FIG. 11 is a flow chart showing readout processing of data to the primary volume according to the embodiment.

Processing to Read Data from Primary Volume:

A flow chart of processing to read data from the primary volume 220 according to the embodiment is shown in FIG. 11. The following processing is realized by executing the snapshot control program 800, which is configured of codes for conducting various operations according to the embodiment, by the CPU 211. Another processing to be described later is also realized in the same way.

First, the storage device 200 receives a data readout request to the primary volume 220 from the information processing unit 100. Then, the snapshot control table 400 is checked to judge whether the target data shall be read from the primary volume 220 or the secondary volume 230 (S1000). When the bit value on the primary volume BM (P) 410 is "0" and the bit value on the secondary volume BM (S) 420 is "1", "YES" is selected in S1001 because data stored in the primary volume 220 is valid. And, the target data is read from the primary volume 220 and sent to the information processing unit 100 (S1002).

Meanwhile, when the bit value on the primary volume BM (P) 410 is "1" and the bit value on the secondary volume BM (S) 420 is "0", "NO" is selected in S1001 because the data stored in the secondary volume 230 is valid. And, a stored position of the target data is obtained with reference to the S-VOL conversion table 500 (S1003), and data is read from the difference volume 240 and sent to the information processing unit 100 (S1004).

Figure 12:
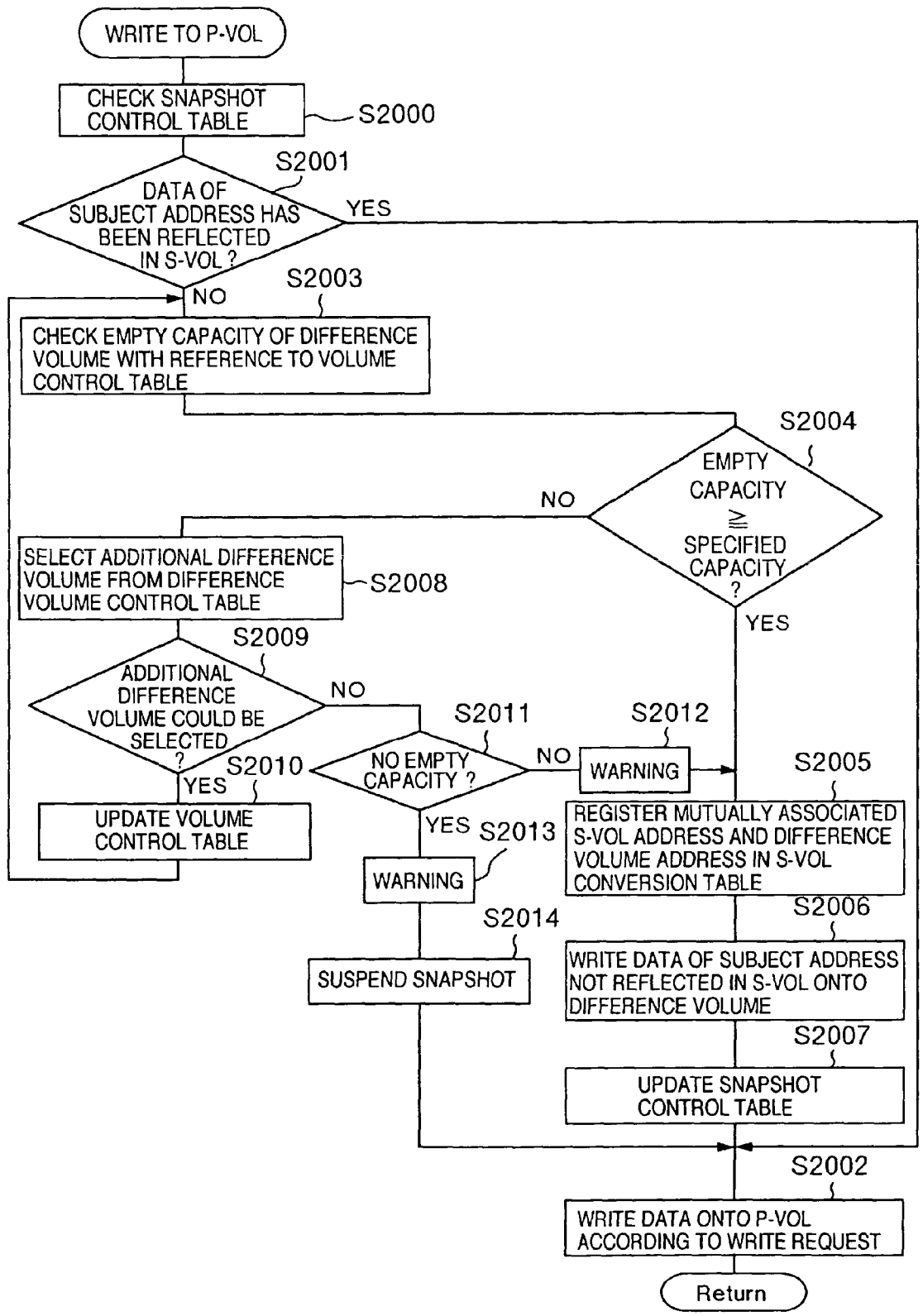
FIG. 12 is a flow chart showing write processing of data into the primary volume according to the embodiment.

Processing to Write Data onto Primary Volume:

Then, a flow chart of a processing to write data onto the primary volume 220 according to the embodiment is shown in FIG. 12.

The storage device 200 receives a data write request to the primary volume 220 from the information processing unit 100. The snapshot control table 400 is checked (S2000) to determine whether data stored in the primary volume 220 and before the update must be reflected in the secondary volume 230. For example, when the storage device 200 controls to read data having the same contents as those of data stored in the primary volume 220 from the secondary volume 230, data stored in the primary volume 220 before the update is not required to be reflected in the secondary volume 230. And, when the storage device 200 controls to read data, which is stored in the primary volume 220 at a prescribed point in time, from the secondary volume 230, it is necessary to reflect the data at a prescribed point in time in the secondary volume 230 if it has not been reflected, and it is not necessary to reflect if it has been reflected.

When it is not necessary to reflect data at a prescribed point in time of the primary volume 220 into the secondary volume 230, "YES" is selected in S2001. And, the data is written onto the primary volume 220 (S2002).

Meanwhile, when it is necessary to reflect the data at a prescribed point in time of the primary volume 220 into the secondary volume 230, "NO" is selected in S2001. And, a storage capacity or an empty capacity in an unused storage area of the difference volume 240 is checked with reference to the volume control table 600 (S2003).

When the empty capacity is equal to or more than a specified capacity (judgment value), "YES" is selected (S2004). The storage position of the data in the secondary volume 230 and the storage position in the difference volume 240 are registered in the S-VOL conversion table 500 (S2005), and a duplicate of the data at a prescribed point in time of the primary volume 220 is written onto the difference volume 240 (S2006). It can also be configured to select "YES" when, for example, the empty capacity is larger than the specified capacity when they are compared in S2004. Then, the bit values of the primary volume BM (P) 410 and the secondary volume BM (S) 420 of the snapshot control table 400 are updated to "0" (S2007), and data is written onto the primary volume 220 (S2002).

In S2004, when the empty capacity of the difference volume 240 is not more than the specified capacity, "NO" is selected. In this case, it is necessary to select another storage volume 241 for using as the difference volume 240 for storing data of the primary volume 220 at a prescribed point in time. For example, the selection can be made with reference to the volume control table 600 and the difference volume control table 700 as described above (S2008). When another storage volume 241 to be used as the difference volume 240 could be selected, "YES" is selected in S2009. And, information on each storage volume of the volume control table 600 is updated (S2010), and the procedure returns to S2003. Then, "YES" is selected in S2004, the above-described individual steps are conducted (S2005 to S2007), and data is written onto the primary volume 220 (S2002).

In S2006, when a duplicate of the data of the primary volume 220 at a prescribed point in time is written onto the unused storage area of the other storage volume 241 selected as described above, it can be written onto a storage area having low data access performance in the unused storage area. For example, some disk drives have a larger number of sectors per track on the tracks closer to the periphery of the disk. And, an amount of data, which can be read or written while the disk makes one turn, is different between the positions closer to and away from the circumference of the disk, and data access performance becomes low toward the center of the disk. The storage area close to the outer periphery of the disk where the data access performance is high is used, for example, to store data used by the information processing unit 100 to provide information processing services, and the storage area close to the center of the disk where the data access performance is low is used to store data at a prescribed point in time of the primary volume 220 according to the embodiment. Thus, when a duplicate of the data of the primary volume 220 at a prescribed point in time is written onto an unused storage area of the other storage volume 241, an effect on the primary information processing service to be provided by using the other storage volume 241 can be retarded. For example, a storage area in the storage volume where the data access performance is low can be identified by the above-described track number. It can also be identified by a data storage address, a sector number or the like.

Meanwhile, when the other storage volume 241 to be used as the difference volume 240 cannot be selected in S2008, "NO" is selected in S2009. The above case where the other storage volume 241 to be used as the difference volume 240 cannot be selected includes, for example, a case where a storage volume usable as the difference volume 240 is not registered in the volume control table 600, a case where a difference volume candidate is not registered in the difference volume control table 700, or a case where all the storage volumes usable for the difference volume 240 have been used as the difference volume 240. Then, it is judged in S2011 whether an unused storage area of the difference volume 240 still has a storage capacity, where data of the primary volume 220 at a prescribed point in time can be written, and when there is a storage area, "NO" is selected. Then, for example, a warning is shown on the user interface possessed by the management device 250 (S2012). When the warning is shown, the operator controlling the storage device 200 can take measures before the difference volume 240 is used up. For example, an additional disk drive can be installed to increase the storage capacity of the difference volume 240. Otherwise, a snapshot command can be sent to the storage device 200 to suspend the holding of data of the primary volume 220 at a prescribed point in time.

In S2011, when a storage capacity enough to write data of the primary volume 220 at a prescribed point in time does not remain in an unused storage area of the difference volume 240, "YES" is selected. For example, a warning is shown on the user interface possessed by the management device 250 (S2013) to suspend the holding of data of the primary volume 220 at a prescribed point in time (S2014). Thus, data of the primary volume 220 at a prescribed point in time stored in the difference volume 240 is determined to be invalid. The bit of the primary volume BM (P) 410 of the snapshot control table 400 is updated to "0", and the bit value of the secondary volume BM (S) 420 is updated to "1". And, data is written onto the primary volume 220 (S2002).

Figure 13:
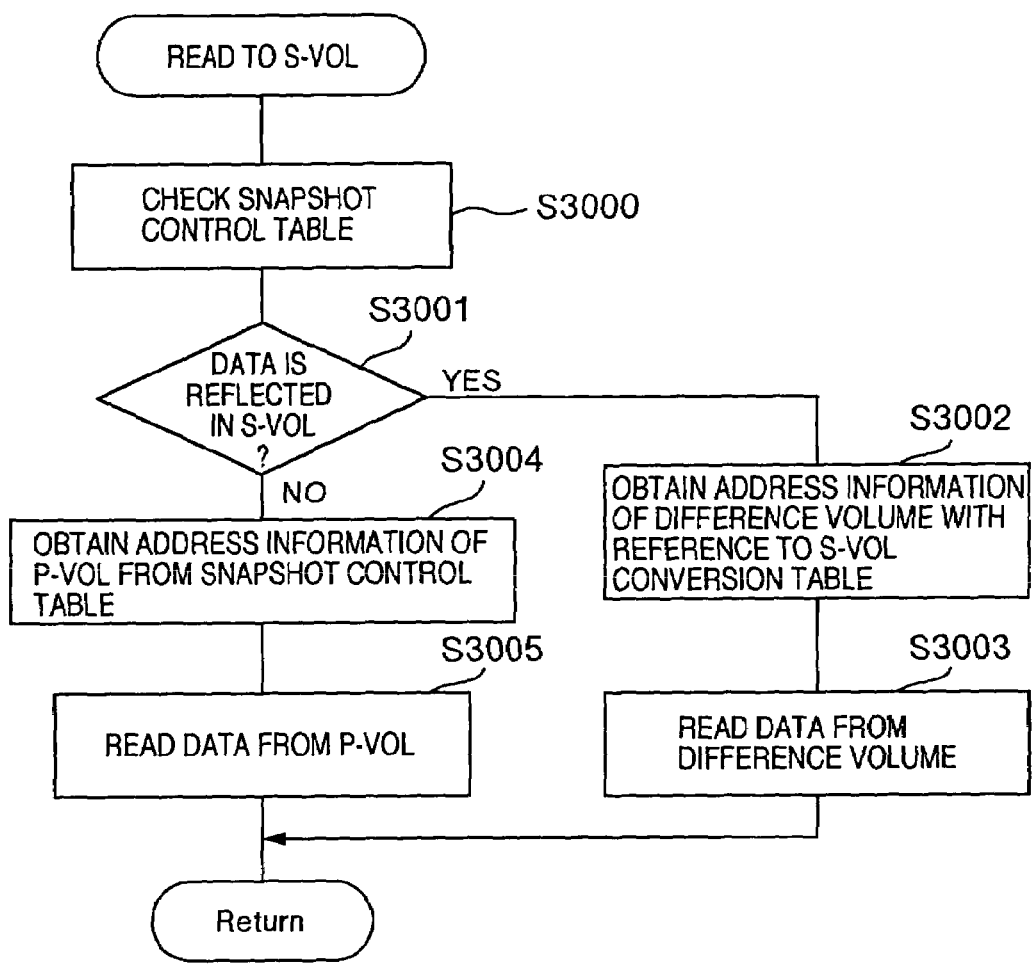
FIG. 13 is a flow chart showing readout processing of data to the secondary volume according to the embodiment.

Processing of Reading Data from Secondary Volume:

Then, a flow chart of processing to read data from the secondary volume 230 according to the embodiment is shown in FIG. 13.

First, the storage device 200 receives a data readout request to the secondary volume 230 from the information processing unit 100. Then, the snapshot control table 400 is checked to determine whether the target data shall be read from the primary volume 220 or from the secondary volume 230 (S3000). When the bit value on the primary volume BM (P) 410 is "0" and the bit value on the secondary volume BM (S) 420 is "1", the data stored in the primary volume 220 is valid, and "NO" is selected in S3001. And, a storage position of the primary volume 220 corresponding to the data of the secondary volume 230 is specified with reference to the snapshot control table 400 (S3004), and the target data is read from the primary volume 220 and sent to the information processing unit 100 (S3005).

Meanwhile, when the bit value on the primary volume BM (P) 410 is "1", the bit value on the secondary volume BM (S) 420 is "0", or both of them are "0", the data stored in the secondary volume 230 is valid, and "YES" is selected in S3001. The storage position of the target data is obtained by referring to the S-VOL conversion table 500 (S3002), and data is read from the difference volume 240 and sent to the information processing unit 100 (S3003).

Figure 14:
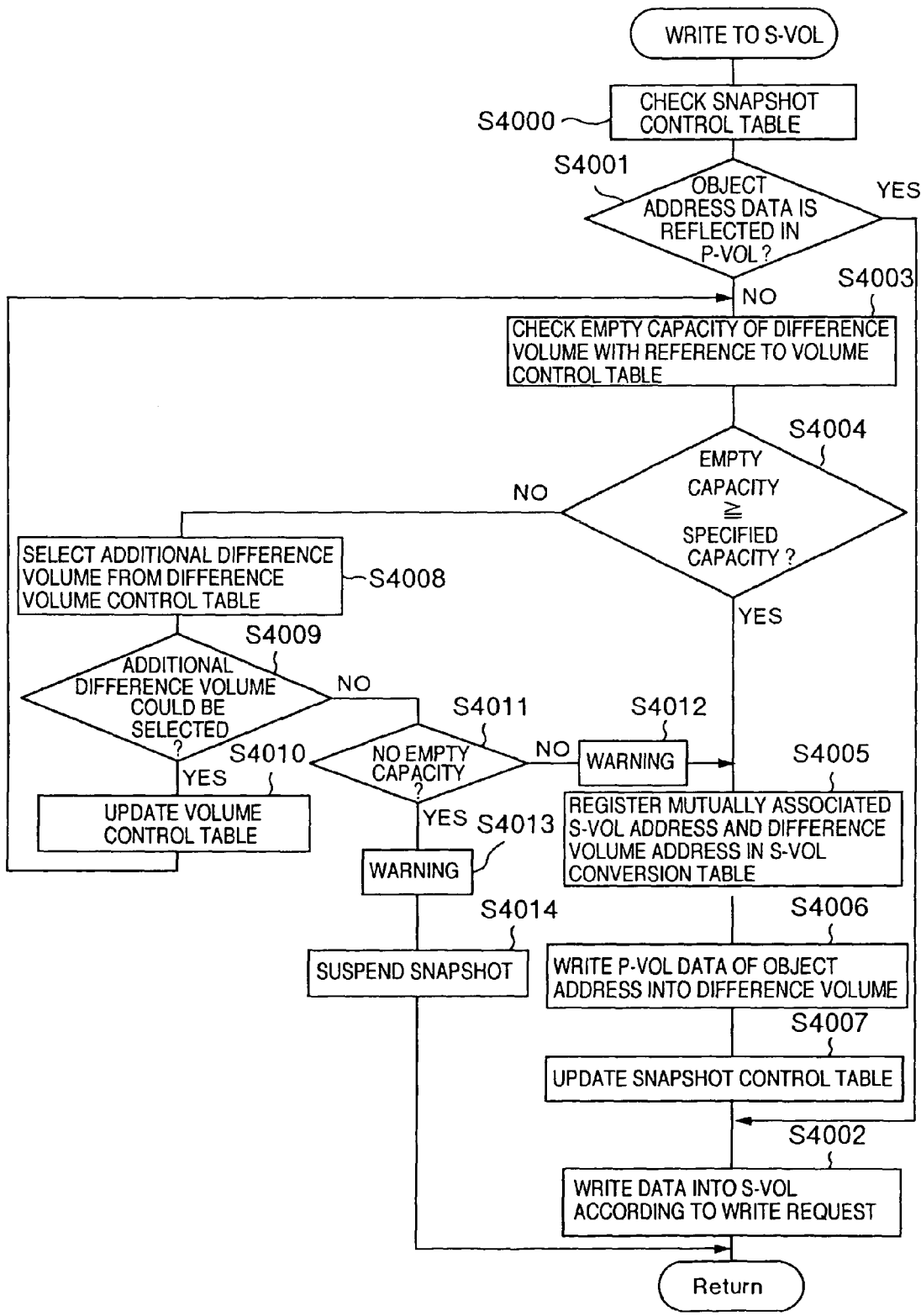
FIG. 14 is a flow chart showing write processing of data into the secondary volume according to the embodiment.
Figure 18:
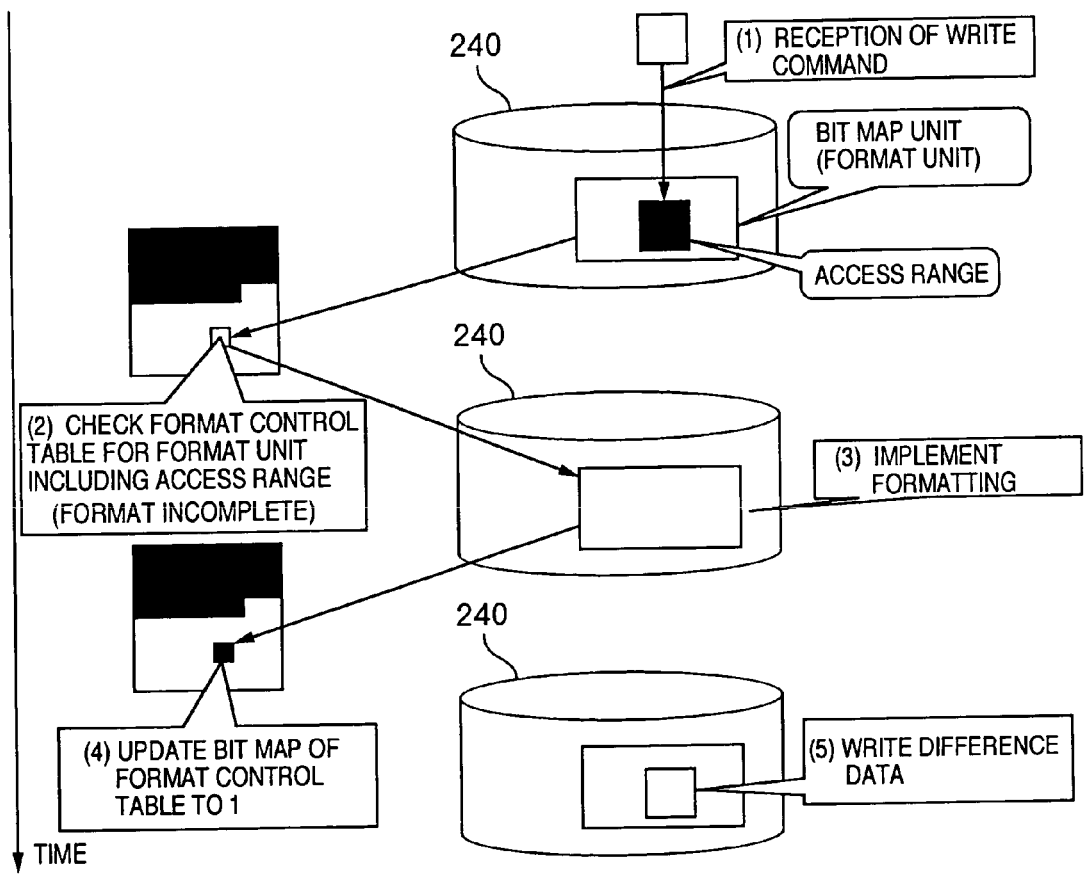
FIG. 18 is a block diagram illustrating a format according to the embodiment.

Processing of Writing Data onto Secondary Volume:

Then, a flow chart of a processing to write data onto the secondary volume 230 according to the embodiment is shown in FIG. 14.

The storage device 200 receives a data write request to the secondary volume 230 from the information processing unit 100. Then, the snapshot control table 400 is checked (S4000) to judge whether data before the update stored in the primary volume 220 has been reflected in the secondary volume 230 or not reflected. For example, when data at a prescribed point in time has not been reflected in the secondary volume 230, it must be reflected, and when it has been reflected, it is not necessary to reflect it.

When data at a prescribed point in time of the primary volume 220 has been reflected in the secondary volume 230, "YES" is selected in S4001. And, data is written onto the secondary volume 230 (S4002). Actually, the data is written onto the storage position of the difference volume 240 corresponding to the secondary volume 230 stored in the S-VOL conversion table 500 (S4002).

Meanwhile, when the data at a prescribed point in time of the primary volume 220 has not been reflected in the secondary volume 230, "NO" is selected to S4001. And, a storage capacity, namely an empty capacity, of an unused storage area of the difference volume 240 is checked with reference to the volume control table 600 (S4003).

When the empty capacity is not less than the specified capacity (judgment value); "YES" is selected (S4004). And, the storage position of the data in the secondary volume 230 and the storage position in the difference volume 240 are registered in the S-VOL conversion table 500 (S4005), a duplicate of the data in the primary volume 220 at a prescribed a point in time is written onto the difference volume 240 (S4006). For example, it may be configured in such a way that, when the empty capacity is larger than the specified capacity when they are compared in S4004, "YES" is selected. Then, the bit values of the primary volume BM (P) 410 and the secondary volume BM (S) 420 of the snapshot control table 400 are updated to "0" (S4007), and data is written onto the secondary volume 230, namely the difference volume 240 (S4002).

When the empty capacity of the difference volume 240 is not more than the specified capacity in S4004, "NO" is selected. Here, it is necessary to select another storage volume 241 to be used as the difference volume 240 for storing data of the primary volume 220 at a prescribed point in time. Thus, the selection can be made by referring to, for example, the volume control table 600 or the difference volume control table 700 as described above (S4008). When another storage volume 241 to be used as the difference volume 240 can be selected, "YES" is selected in S4009. And, information on each storage volume of the volume control table 600 is updated (S4010), and the procedure returns to S4003. Then, "YES" is selected in S4004, the processing of the individual steps described above is conducted (S4005 to S4007), and data is written onto the secondary volume 230, namely the difference volume 240 (S4002).

In S4006, when a duplicate of the data of the primary volume 220 at a prescribed point in time is written onto an unused storage area of the selected other storage volume 241 as described above, it can be configured to write onto a storage area, where data access performance is low, in the unused storage area.

Meanwhile, when the other storage volume 241 to be used as the difference volume 240 cannot be selected in S4008, "NO" is selected in S4009. Then, it is judged in S4011 whether an unused storage area of the difference volume 240 still has a storage capacity where data of the primary volume 220 at a prescribed point in time can be written, and when there is a storage capacity, "NO" is selected. And, for example, a warning is shown on the user interface possessed by the management device 250 (S4012). When the warning is shown, the operator controlling the storage device 200 can take measures before the difference volume 240 is used up. For example, an additional disk drive can be installed to increase the storage capacity of the difference volume 240. It can also be configured to send a snapshot command to the storage device 200 so to suspend the holding of the data of the primary volume 220 at a prescribed point in time.

In S4011, when an unused storage area of the difference volume 240 does not have a storage capacity where data of the primary volume 220 at a prescribed point in time can still be written, "YES" is selected. And, for example, a warning is shown on the user interface possessed by the management device 250 (S4013) to suspend the holding of data of the primary volume 220 at a prescribed point in time (S4014).

Writing of Data to Storage Volume:

It is generally necessary to format a storage volume, which is possessed by the storage device 200, before writing data onto it. The formatting is a processing to make it possible to write or read data by dividing the storage area provided by a storage media such as a disk drive configuring the storage volume into sections for storing data. The sections can be sectors set on the tracks formed on, for example, a disk drive.

The storage device 200 according to the embodiment can format in two modes. Specifically, they are a first format mode and a second format mode as shown in FIG. 17. Formatting to be conducted in the first format mode or the second format mode can be decided by switching according to, for example, an instruction given from the user interface possessed by the management device 250. The storage device 200 format in the second format mode only.

In the first format mode, the storage device 200 receives an instruction to conduct formatting from the information processing unit 100 or the management device 250 and starts formatting the designated storage volume. While formatting, it does not accept a data I/O request to the storage volume. When the formatting is completed, it starts accepting a data I/O request to the storage volume.

Meanwhile, in the second format mode, the storage device 200 receives an instruction to conduct formatting from the information processing unit 100 or the management device 250 and starts formatting the designated storage volume. Even while formatting, it accepts a data I/O request to the storage volume. Here, when the storage device 200 receives a data I/O request to the storage volume even if the formatting has not completed, it controls the data input/output as if the formatting has completed.

Therefore, when the storage device 200 accepts a data I/O request while it is formatting in the second format mode, there are occasions that the data I/O processing must be conducted to the storage area of which formatting has not completed. For example, where the difference volume 240 is formatted in the second format mode in this embodiment, there may be cases where a storage area, in which the data is to be written, has not been formatted when the data is written onto the difference volume 240 described with reference to FIG. 12 and FIG. 14. In such a case, it is configured to write data after formatting the storage area which is required in order to write the data as shown in FIG.

18. Thus, the data I/O processing can be made even if a data I/O request is made to the storage volume which has not been formatted.

The second format mode according to the embodiment will be described below.

Where a storage volume is formatted in the second format mode, the format control table 900 is used to control whether the above-described individual sections have been formatted or not. Formatting using the format control table 900 is shown in FIG. 15. The format control table 900 can be provided for each storage volume.

An example of the format control table 900 is shown in FIG. 16. In FIG. 16, (xfi, yfj) (i, j=1, 2, . . . ) is information used to specify a storage position on the storage volume for each section. For example, it can be configured that when each section corresponds to one sector on the disk drive, xfi (i=1, 2, . . . ) corresponds to a tack number determined on the disk drive, and yfj (j=1, 2, . . . ) corresponds to a sector number determined on the track. And, for the sections which are formatted, "1" is shown in the format control table 900, and "0" is shown for the sections which are not formatted. Thus, the storage device 200 can control whether the individual sections of the storage volume have been formatted or not. Therefore, a data I/O request can be accepted from the information processing unit 100 even while formatting, and the data I/O processing can be conducted even if the data I/O request is made to the storage area which is not formatted.

Figure 19:
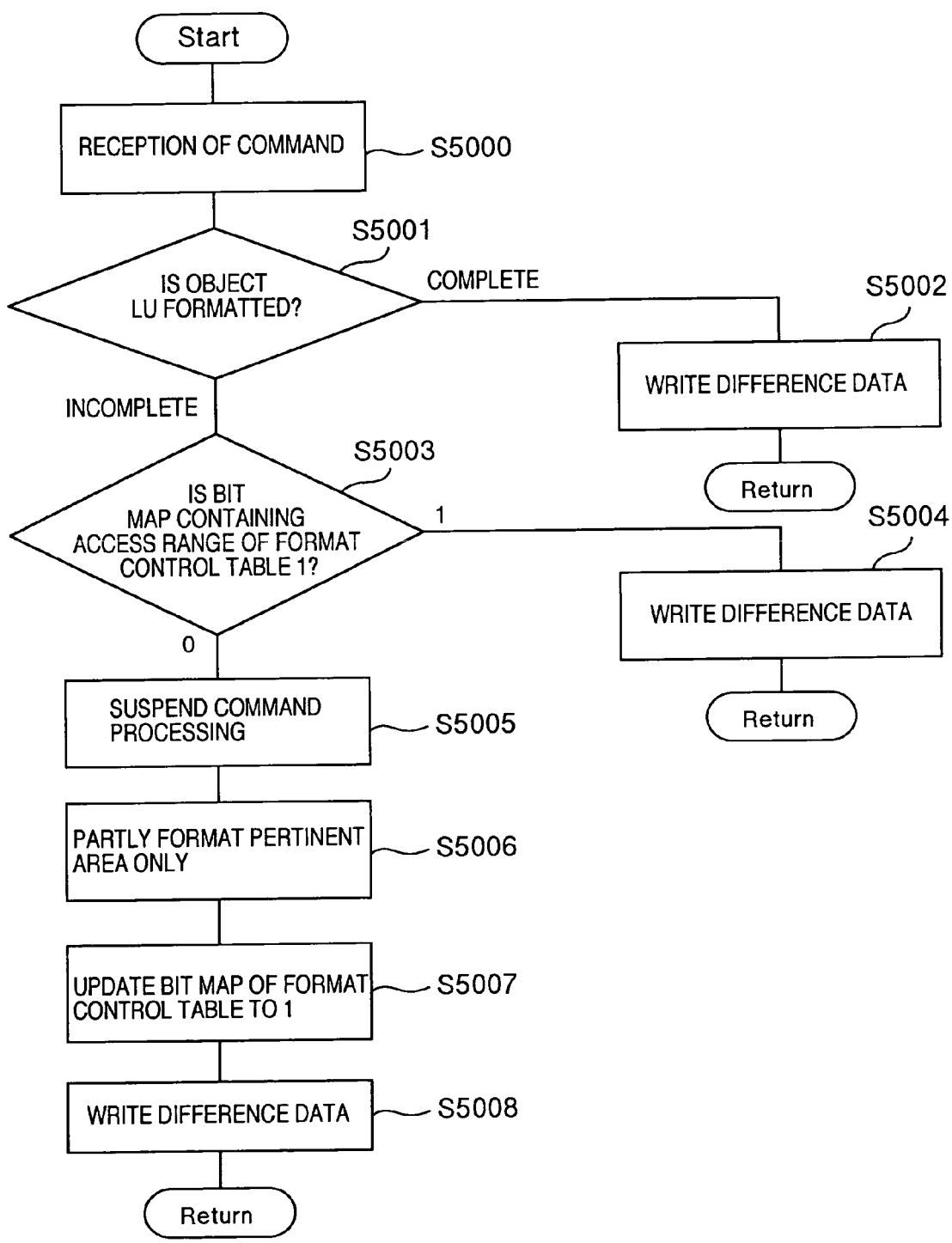
FIG. 19 is a flow chart showing format processing according to the embodiment.

Then, processing to be conducted in response to a data write request to the storage volume which is formatted in the second format mode will be described with reference to the flow chart shown in FIG. 19. FIG. 19 shows that the above-described difference volume 240 is formatted in the second format mode. This processing can also be applied to a case that another storage volume is formatted in the second format mode. Processing to be described is realized by the CPU 211 which executes the snapshot control program 800 comprised of cods for performing the various operations according to this embodiment. The CPU 211 can also execute programs other than the snapshot control program 800 to realize the following processing.

First, the storage device 200 receives a data write request from the information processing unit 100 (S5000). Then, it is checked whether the storage volume to which the data write request is made has been formatted (S5001) For that, for example, a flag indicating whether the formatting has completed or not can be provided for each storage volume, and it can be checked. In this case, the flag is set by the storage device 200 after the completion of formatting of the storage volume. Then, when the storage volume has been formatted, "Completion" is selected, and data is written onto the difference volume 240 (S5002).

When the formatting has not been completed, "Incompletion" is selected. Referring to the format control table 900, it is checked whether the storage area, which is subject to the data I/O request, has been formatted (S5003). When the formatting has been completed, "1" is selected, and data is written onto the difference volume 240 (S5004).

When the formatting has not been completed, "0" is selected. And, processing of the data I/O request is temporarily stopped in order to format the storage area (S5005). And, the storage area is formatted (S5006). The format control table 900 is updated (S5007), the processing of the data I/O request is resumed, and data is written onto the storage area of the difference volume 240 (S5008).

Thus, a data I/O request can be received even while formatting in the second format mode, and the data I/O processing can be executed even if the data I/O request is made to a storage area which has not been formatted.

As described above, according to this embodiment, the snapshot control can be continued even when the difference volume 240 used for the snapshot control has an insufficient storage capacity.

Thus, it becomes possible to suppress, for example, the storage capacity to be prepared in advance as the difference volume 240. It is also possible to eliminate the difference volume 240 to be prepared in advance. The difference volume 240 is a storage volume for storing data at a prescribed point in time before the update of the primary volume 220 but not a storage volume used for the information processing service provided by the information processing unit 100. Therefore, the storage capacity prepared as the difference volume 240 can be suppressed by this embodiment, and the cost performance of the computer system and the storage device 200 can be improved.

For example, even if the storage area of the difference volume 240 has been used up during the backup processing, it is not necessary to suspend the backup processing. Thus, the backup processing can be conducted surely, so that the reliability of the computer system can be improved.

Similarly, when data of the primary volume 220 at a prescribed point in time virtually stored in the secondary volume 230 is used to execute a test program or a simulation program, the execution of the program can be continued even if the storage area of the difference volume 240 is used up.

According to this embodiment, an empty capacity of the difference volume 240 is shown on the user interface possessed by the management device 250 or the information processing unit 100. Thus, the operator controlling the computer system can know a situation of executing the snapshot control and can adequately take measures for, for example, additional installation of the difference volume 240.

When the difference volume 240 has a decreased empty capacity, a warning is shown on the user interface possessed by the management device 250 or the information processing unit 100. Thus, the operator controlling the computer system can take measures such as installation of an additional disk drive to increase the storage capacity of the difference volume 240, a suspension of the snapshot control or the like before the difference volume 240 is used up and the snapshot control is suddenly stopped.

According to the embodiment, even while the storage volume is being formatted, a data I/O request to the pertinent storage volume can be accepted. Thus, it is possible to accept a data I/O request from the information processing unit 100 even while formatting and to conduct the data I/O processing even if the data I/O request is to the storage area which is not completely formatted.

The embodiment described above is used to facilitate understanding of the present invention and not to limit the interpretation of the present invention. Various changes and modifications of the invention may be made without departing from the spirit and the scope of the invention and equivalence of them is also included in the invention.

What is claimed is:

1. A storage device, comprising:
   first, second and third storage volumes for storing data;
   a virtual storage volume which is virtually possessed by the storage device; and
   a control unit, wherein
   the control unit includes:

means for receiving, from an information processing unit, a request for update of the data as the data exists at a prescribed point in time, the updated data to be stored in the first storage volume after the prescribed point in time;

means for storing a duplicate of the data as the data exists at the prescribed point in time before the update, onto the second storage volume;

means for storing, in an unused storage area of the third storage volume, a duplicate of the data as the data exists at the prescribed point in time before the update, in response to a determination that the second storage volume has a predetermined state; and a memory control unit which manages or controls a correspondence between the first, second and third storage volumes and the virtual storage volume, wherein the memory control unit includes information concerning to which one of the first, second and third storage volumes an access is to be made in response to a data I/O request from the information processing unit by reference to the correspondence.

2. The storage device according to claim 1, wherein:

the predetermined state of the second storage volume, at which the duplicate of the data is stored onto the unused storage area of the third storage volume, exists when a storage capacity of the unused storage area of the second storage volume is smaller than a judgment value.

3. The storage device according to claim 2, further comprising:

means for showing a storage capacity of the unused storage area of the second storage volume on a user interface.

4. The storage device according to claim 2, further comprising:

means for showing a warning on a user interface relating to a storage capacity of the unused storage area of the second storage volume.

5. The storage device according to claim 1, further comprising:

means for selecting the third storage volume in response to information which is input through a user interface to designate the third storage volume.

6. The storage device according to claim 1, further comprising:

means for selecting the third storage volume in response to a determination that a storage capacity of an unused storage area of the individual storage volumes possessed by the storage device having a predetermined value.

7. The storage device according to claim 1, wherein:

the means for storing in the second storage volume the duplicate of the data at the prescribed point in time includes:

means for dividing a portion of the storage area, onto which the duplicate of the data is stored, among the storage areas of the second storage volume into sections for storing the data; and means for writing the duplicate of the data onto a portion of the storage area divided into the sections.

8. The storage device according to claim 1, wherein:

the means for storing onto the unused storage area of the third storage volume the duplicate of the data at the prescribed point in time includes:

means for dividing into sections for storing the data a portion of the unused storage area, onto which the duplicate of the data is stored, in the unused storage areas of the third storage volume; and means for writing the duplicate of the data onto a portion of the unused storage area which is divided into the sections.

9. The storage device according to claim 2, wherein the control unit further includes a volume management unit which has information of a storage capacity of the unused storage area of each of the first, second and third storage volumes.

10. The storage device according to claim 2, wherein the control unit further includes a volume management unit which has information indicating whether each of the first, second and third storage volumes is used as a volume for storing the duplicate of the data at the prescribed point in time before the update in a snapshot control, a volume allowed to store the duplicate of the data or a spare volume, or has information indicating whether the spare volume is allowed to store data.

11. The storage device according to claim 1, wherein each of the means for storing stores the duplicate of the data at the prescribed point in time before the update onto a storage area having a low data access performance in the unused storage area of the second or third storage volume, respectively.

12. The storage device according to claim 1, wherein each of the means for storing stores data used by the information processing unit to provide information processing services onto a storage area having a high data access performance in the unused storage area of the second or third storage volume, respectively.

13. The storage device according to claim 2, wherein the control unit further includes means for formatting the first, second and third storage volumes by a first format mode or a second format mode, wherein the first format mode is arranged not to accept a data I/O request to the storage volume being formatted during the formatting, while the second format mode is arranged to accept a data I/O request to the storage volume being formatted even during the formatting.

14. A method of controlling a storage device provided with first, second, and third storage volumes for storing data, comprising:

receiving, from an information processing unit, a request for update of the data as the data exists at a prescribed point in time, the updated data to be stored in the first storage volume after the prescribed point in time;

storing a duplicate of the data as the data exists at the prescribed point in time before the update, onto the second storage volume;

storing the duplicate of the data as the data exists at the prescribed point in time before the update, onto an unused storage area of the third storage volume in response to a determination that the second storage volume has a predeterminated state;

managing or controlling a correspondence between the first, second, and third storage volumes and a virtual storage volume which is virtually possessed by the storage device; and controlling to which one of the first, second, and third storage volumes an access is to be made in response to a data I/O request from the information processing unit by reference to the correspondence.

15. The method of controlling a storage device according to claim 14, wherein:

the predetermined state of the second storage volume, at which the duplicate of the data is stored onto the unused storage area of the third storage volume, exists when a storage capacity of the unused storage area of the second storage volume is smaller than a judgment value.

16. The method of controlling a storage device according to claim 15, further comprising:
showing the storage capacity of the unused storage area of the second storage volume on a user interface.

17. The method of controlling a storage device according to claim 15, further comprising:
showing a warning on the user interface relating to the storage capacity of the unused storage area of the second storage volume.

18. The method of controlling a storage device according to claim 14, further comprising:
selecting the third storage volume in response to information which is input through the user interface to designate the third storage volume.

19. The method of controlling a storage device according to claim 14, further comprising:
selecting the third storage volume in response to a predetermination that a storage capacity of an unused storage area of the individual storage volumes possessed by the storage device having a predetermined value.

20. The method of controlling a storage device according to claim 14, wherein:
the step of storing the duplicate of the data at the prescribed point in time onto the second storage volume comprises:
dividing a portion of the storage area, onto which the duplicate of the data is stored, among the storage areas of the second storage volume into sections for storing the data; and
writing the duplicate of the data onto a portion of the storage area divided into the sections.

21. The method of controlling a storage device according to claim 14, wherein:
the step of storing the duplicate of the data at the prescribed point in time comprises:
a step of dividing into sections for storing the data a portion of the unused storage area, onto which the duplicate of the data is stored, in the unused storage area of the third storage volume; and
a step of writing the duplicate of the data onto a portion of the unused storage area which is divided into the sections.

* * * * *